May 5, 1931.  H. RESCH  1,804,232
COMBINED TYPEWRITING AND COMPUTING MACHINE
Filed Feb. 27, 1926  2 Sheets-Sheet 1
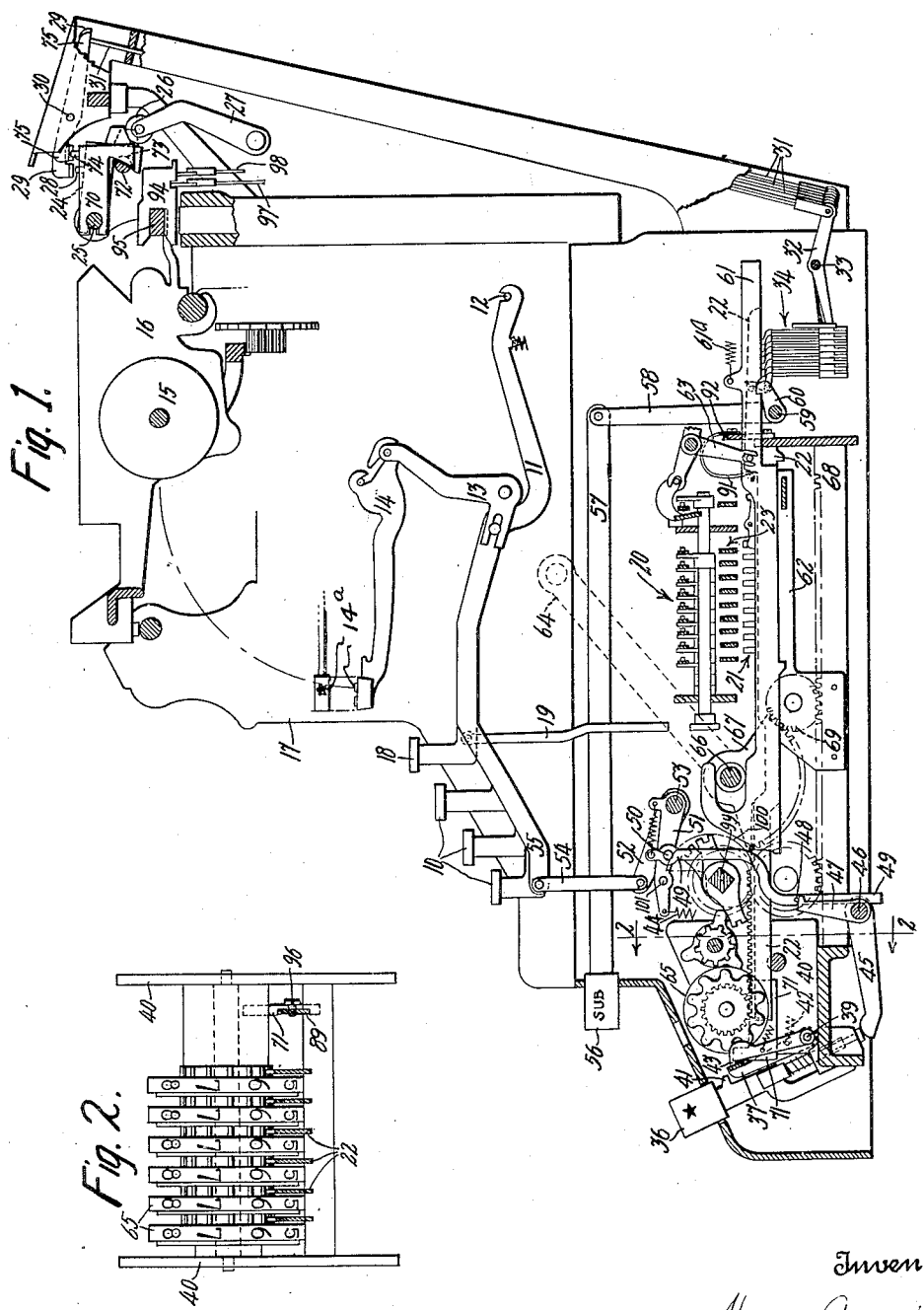
Inventor
Henry Resch
By D C Stickney
Attorney May 5, 1931.  H. RESCH  1,804,232
COMBINED TYPEWRITING AND COMPUTING MACHINE
Filed Feb. 27, 1926    2 Sheets-Sheet 2
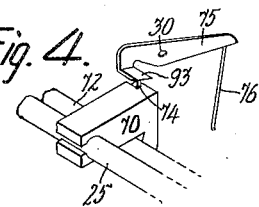
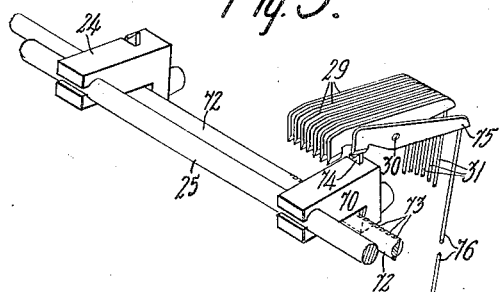
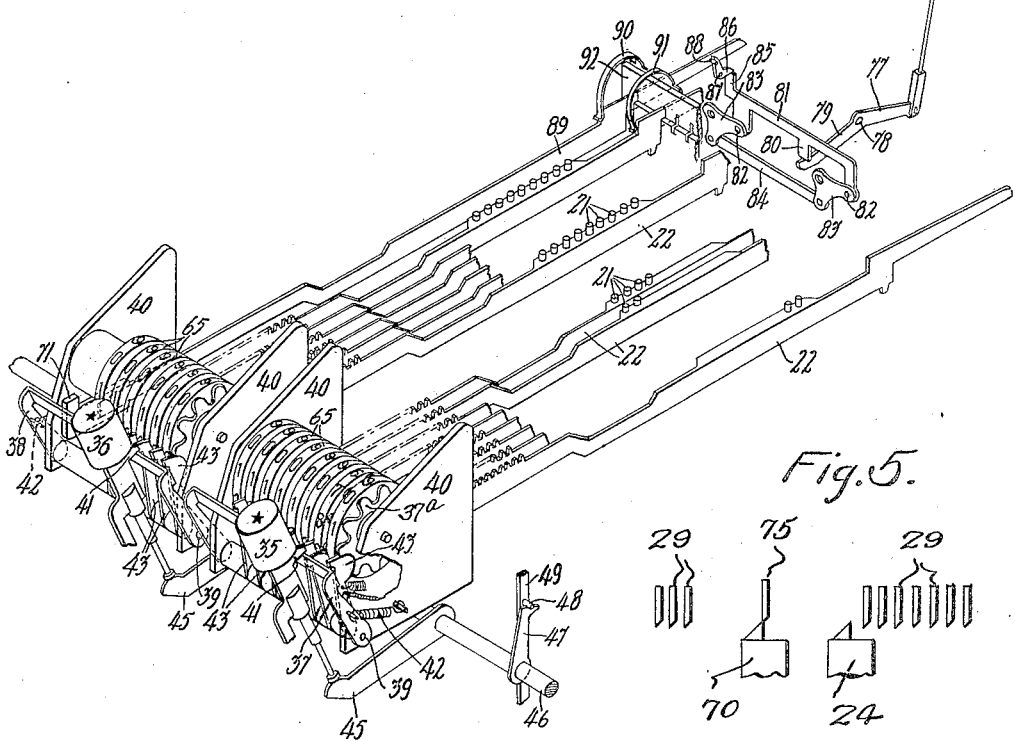
Inventor:
Henry Resch
by B C Stickney
Attorney Patented May 5, 1931

1,804,232

UNITED STATES PATENT OFFICE

HENRY RESCH, OF BAYONNE, NEW JERSEY, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING AND COMPUTING MACHINE

Application filed February 27, 1926. Serial No. 91,030.

This invention relates to combined typewriting and computing machines of the well-known Underwood-Hanson type. Said machines are usually used to type upon a worksheet numbers which are computed in the registers, one register being appropriated for each column of typing on the work-sheet.

In computing machines which print and register numbers simultaneously, it is advantageous to prevent errors, for the reason that errors, when once made, are very difficult to correct. To this end, it is customary to provide each register with a clearance-sign key which operates a type-bar for typing a clearance-sign adjacent the typed number on the work-sheet. Said clearance-sign key is depressible only when all the computing wheels of each register stand at zero, and cannot be operated when any one of the wheels shows any other digit. By means of this arrangement, it is possible, after having set the machine for subtraction, to copy the amount shown by the register upon the work-sheet, and to simultaneously clear the register. After this, the operative may depress the clearance-sign key to ascertain the accuracy of the transaction, since the fact that the key is depressible indicates that all the wheels stand at zero position.

In machines having more than one register it is possible to type a clearance-sign after the clearing of each register, and since there is provided a clearance-sign-key for each register, and since all the clearance-sign keys actuate upon the same clearance-sign type-bar, it is easy to depress a wrong key, that is to say, a key corresponding to the register in which computations have been previously cleared.

One of the features of this invention relates to the provision of means whereby only the clearance-sign-key of the register in which the computations are being cleared can be depressed, thereby eliminating the possibility of typing a clearance-sign on the work-sheet which would give a false assurance of accuracy. According to certain features of this invention, advantage is taken of the fact that the clearance-sign is always typed immediately after typing the numeral of lowest denomination of a number which is copied from its associated register. Since the latter-space position of the carriage is always the same when typing the clearance-sign, within a computing zone, means are provided for locking the clearance-sign-key of the adjacent register when the carriage is moved to this predetermined position. Said means may include an adjustable dog settably mounted upon the rear of the carriage and operatively connected to actuate a locking bail which is usually provided in the Underwood machine, for the purpose of locking the clearance-sign-key when any one of the computing wheels in the register is not cleared to zero. The locking bail is automatically forced into the path of the clearance-sign key thereby preventing its depression.

According to one form of the invention, mechanism is provided whereby the register adjacent the one in which computations are being made may be held in its locked position during several letter-space movements of the carriage. This is advantageous in some cases where it is desired to letter-space the carriage before typing the clearance sign, and where it is desirable to type two or more significant characters in lieu of the star, as for example. It may be desirable, in some forms of computing, to include the typing of a TOT after the typing of a total which clears the register. The TOT would be separated from the last digit typed by a letter-space distance caused by the depression of the spacebar, which ordinarily would release the locked star-key of the adjoining register. The typing of the TOT would come under the same restrictive control of a TOT key should there be errors in clearing the register.

Other features and advantages will hereinafter appear.

In the accompanying drawings,

Figure 1 is a sectional view in elevation of a combined Underwood-Hanson typewriting machine, showing the means for automatically locking the clearance-sign-key adjacent the register in which computations are made, all the parts being shown in their normal positions.

Figure 2 is a sectional view on line 2—2 of Figure 1, and shows the locking bar mounted on a special pin-bar from which the pins have been removed.

Figure 3 is a perspective view showing two registers in which both clearance-sign-keys are locked by means of their associated locking bails. The clearance-sign-key of the left-hand register is shown locked by the mechanism controlled by the carriage, while the clearance-sign-key of the right-hand register is shown locked because one of the wheels is not cleared to the zero position.

Figure 4 illustrates one form of the invention, and shows the means for automatically locking the adjacent clearance-sign-key for two or more consecutive letter-space positions of the carriage.

Figure 5 shows the two tappets on the carriage in operative relation for locking one of the star-keys.

In the Underwood computing machine, to which this invention is applied, there is provided a typewriting machine mounted over a casing which includes the computing mechanism. The typewriting machine has a series of depressible keys 10 which operate key-levers 11 fulcrumed at 12, the levers being operatively connected to a rocking arm 13, to swing type-bars 14. Said type-bars are designed to strike a platen 15, which is rotatably mounted on a carriage 16, arranged for letter-space travel on the frame of the machine, which is indicated generally by the numeral 17.

The keyboard is provided with number-keys 18 operatively connected by means of links 19 to a setting frame 20, which serves as means for setting the corresponding pins 21 of pin-bars 22. When any one of the number-keys 18 is depressed, its link 19 operates its associated setting bar 23, which bar strikes only the pin of the setting bar, which has been advanced to setting position, by means of a selecting mechanism controlled by the carriage. Said carriage-selecting mechanism comprises selecting dogs 24 mounted on a bar 25, and may be thrown into operating position by means of a roll 26 mounted on a rocking frame 27. The dogs 24 are provided with pawls 28, which operate levers or jacks 29 only when the carriage is moved in letter-space direction, but which are ineffective to swing the levers 29 when the carriage is returned. Said levers 29 are rockably mounted at 30, and are operatively connected to a connecting rod 31, extending downwardly and engaging with reversing levers 32, which are rockably mounted upon a shaft 33 engaging with the usual transposition devices 34, the latter serving as a means for advancing the corresponding pin-bar to setting position.

For the purpose of illustration, only two registers have been shown in Figure 3, but it should be understood that any number of pairs of registers could be used without departing from the spirit of this invention. According to certain features of this invention, each one of these two registers is used to compute numbers typed in two different columns of the work-sheet, and, since each of the registers is provided with an associated clearance sign or star keys 35 and 36, it will be seen that it is easy for the operative to depress the wrong star-key, thereby giving a false assurance that the register has been cleared. It will be noted in this figure that the series of jacks 29 are for the left-hand register, and the series of jacks for the right-hand register are omitted to expose a special jack or lever, to be described.

Each of the star-keys has a locking mechanism, which may include bail-pieces 37 and 38 pivotally mounted at 39 on the sides of the register side frame 40. The bail-pieces 37 and 38 are normally held out of the path of teeth 41, on the stems of the star-keys, by means of springs 42, thereby permitting the depression of a star-key when all the wheels stand at zero. When any one of the wheels is rotated so that a number is either added or subtracted therefrom, then the bail-pieces 37 and 38 are swung away from the wheels and into the path of said teeth 41, by means of detents 43, of which there is one provided for each wheel.

In order to make the depression of the star-key easy, mechanism is provided whereby most of the work is done by the general operator which loads the mechanism by stretching a spring 44, and then the star-key has only to release the mechanism to permit the clearance-sign type-bar 14 to print. Upon the depression of either of the star-keys, a lever 45 is swung downwardly to rock a shaft 46, to which there is fast a pawl 47 engaging with a pin 48, fast to a link 49, which link is pivotally mounted at 50 on an arm 51. When the pawl 47 is pulled away from the pin 48, by the action of either of the star-keys, the spring 44 is permitted to act downwardly, thereby swinging an arm 52 fast to a shaft 53 upon which the arm 51 is also secured. The arm 52 is operatively connected by means of a link 54 to a key-lever 55, which operates to swing the clearance-sign type-bar 14.

The usual method of operating the Underwood-Hanson machine is to set a subtraction-key 56 prior to copying the amount shown in the register, and to clear the register simultaneously when typing the amount shown by the register. After this, the operator depresses the star-key to print a clearance-sign 14ᵃ on the work-sheet, which sign can only be typed in case the number has been accurately copied from the register and all the round noses 43 of the levers 37 have registered with deep notches in the detent-wheels 37ᵃ of the numeral-wheels which indicate zero-positions, as described more in detail in the patent to Hanson, No. 1,416,464, dated May 16, 1922.

The subtraction-key 56 is mounted at the end of a bar 57, operatively connected to an arm 58 to rock a shaft 59, which carries a latching pawl 60 for normally holding a subtraction-bar 61 in its normal position, as shown in Figure 1. Upon releasing the pawl 60, a spring 61ᵃ is permitted to draw on the bar 61, and which, by means of an operating lever 63 and associated mechanism, shifts the setting frame 20 to subtracting position, in a manner illustrated in the patent to Hans Hanson, No. 1,278,812, dated September 10, 1918.

In this type of machine a pin may be set in each pin-bar seriatim, and then a handle 64 is pulled forwardly to operate a general operator 62, which picks up the pin-bars and rotates each dial-wheel 65 an amount corresponding to the denominational value of the pin set in each bar. The handle 64 is pivotally mounted on a shaft 66, which carries a sector 67 fast thereto, and the sector engages with a rack 68 on the general operator by means of an intermediate pinion 69.

Referring more particularly to Figure 3, it will be noted that, after having cleared the left-hand register, the carriage is shifted to a position corresponding to the position of the right-hand register, which is also cleared, and then immediately the star-key 35 of this register is depressed so as to print a clearance-sign adjacent the number typed on the work-sheet. It will be seen that it is easy for the operator to depress the left-hand star-key 36 of the cleared register instead of the right-hand star-key 35, in which case, owing to the fact that the right-hand register may not be clear, an inaccurate statement of a clear register would appear on the work-sheet. To guard against this condition, there is provided special mechanism which automatically locks the star-key 36 when the carriage reaches the position at which the star-key 35 is usually depressed. Said mechanism comprises a special dog 70, which is slidably mounted on the cross-bar 25 and is settable by means of another cross-bar 72 having teeth 73 designed to engage teeth in the dog 70. Said dog 70 is provided with a pawl or tappet 74, which swings a lever 75 similarly to the levers 29, and depresses a connecting link 76, thereby rocking a lever 77 pivotally mounted at 78. The forward extension 79 of the lever 77 engages with a downwardly-extending tab 80 of a bar 81, which is mounted at 82 on arms 83, said arms being connected by means of a link 84 in a manner to impart to the bar 81 a parallel motion. The bar 81 is provided at one end thereof with an upwardly-extending tab 85, which is effective to swing a bell-crank 86 rockably mounted on a fixed pivot 87 and acting upon a pin 88 fast to a locking bar 89, which may be an ordinary pin-bar with the pins and the teeth removed. Said locking bar 89 may have a piece 71 fast thereto, which piece extends upwardly and engages with the left-hand locking bail 38, thereby forcing it into the path of the tooth 41 of the left-hand star-key 36 and preventing the depression of the key. The locking bar 89 is held in its normal position by means of a spring 90, which may be similar to springs 91 acting on the pin-bars. Said springs are fast to a fixed comb-piece 92 in which the pin-bars are slidably mounted.

In a modified form of the invention the lever 75, shown in Figure 4, is provided with an elongated or foot tab 93, to be engaged by the pawl 74 and hold the locking-bar 89 in its effective key-locking position during several letter-space movements of the carriage. The advantage of this form of the invention is a further protection against errors by providing that the star-key 36 may still be locked after an erroneous depression of the space-bar one or two spaces, which otherwise would release the star-key 36 to type a star two spaces removed from the digit of lowest denomination, although the star-key 35 is still locked against depression.

Sometimes it is desired to automatically change the machine to subtraction from its normal adding position when the carriage is moved to a certain zone, and also to automatically start a motor, not shown, which operates the general operator instead of the handle 64. To this end, there are provided tripping pieces 94 (Figure 1) adjustably mounted on a toothed bar 95, each tripping piece engaging with connecting links 97 and 98 for operating mechanisms, not shown.

In order to facilitate the assembling and the adjustment of the locking bar 89, it is proposed to first detach the piece 71, which is secured thereto by means of a screw 96, see Figure 2, and then the bar may be slid to the rear of the machine, the same as any of the pin-bars.

After depressing either of the star-keys, the general operator is cycled by automatic means, not shown, and at this time the automatic star typing mechanism is automatically loaded or reset, advantage being taken of a carrying shaft 99 (Figure 1) which operates only during the return movement of the general operator, said shaft 99 having a cam-plate 100 which engages with a pin 101 fast to the arm 51 and which arm is forced upwardly to restore the type-bar when the cam is rotated during the return movement of the general operator.

At Figure 5 the dog 24 is shown as having released the jack 29 of lowest denomination for the right-hand register, and the dog 70 has moved to lift the lever 75 to effect the locking of the star-key 36.

At the Figure 3 positions, the left-hand register stands cleared, but the star-key 36 is locked against depression by the carriage-shifted bail 38. The right-hand register is being cleared, but an error was made in reading the tens-wheel thereof and this misplaced or uncleared wheel holds the bail 37 in position to prevent the depression of the star-key 35. Were it not for the temporary locking of the key 36 by the movement of the carriage in leaving one computing zone and entering another zone, the key 36 could be depressed to print a star in the computing zone of the right-hand register to show a cleared register, while, in fact, the register is not cleared, but is conditioned to improperly accumulate succeeding records. The star-keys are normally free when their registers are cleared, and the movement of the carriage locks the star-keys of the one or more cleared registers at the left hand of the register being cleared.

Variations may be resorted to within the scope of the invention, and portions of the improvements may be used without others.

Having thus described my invention, I claim:

1. In a computing machine having numeral-keys, a traveling carriage, a plurality of registers, each having a series of computing wheels, a special clearance-sign type-bar, and a plurality of independently-operable special clearance-sign keys, one for each register, all of the clearance-sign keys being effective to operate the clearance-sign type-bar; means controlled by the carriage at a predetermined position thereof for locking the clearance-sign key of the register adjacent the register in which computations are made.

2. In a computing machine having numeral-keys, a traveling carriage, a plurality of registers, each having a series of computing wheels, a special clearance-sign type-bar, and a plurality of independently-operable special clearance-sign keys, one for each register, all the clearance-sign keys being effective to operate the clearance-sign type-bar; means controlled by the carriage at a predetermined position thereof for locking the clearance-sign key of a cleared register adjoining the register in which computations are being made, said locking means including an adjustably-mounted dog on the carriage and a transmitting linkage operatively connecting said dog with the locking bail for the clearance-sign key of the adjoining cleared register, to lock said key.

3. In a combined typewriting and computing machine having numeral-keys, a traveling carriage, a plurality of adjoining registers, each having denominational wheels, a clearance-sign key for each register, a common clearance-sign type-bar operated by said clearance-sign keys, and a bail-piece for locking the clearance-sign key of each register when numbers are computed in the register; means controlled by the carriage at a predetermined position thereof, for locking the clearance-sign key of a cleared register adjoining the register in which computations are being cleared.

4. In a combined typewriting and computing machine having numeral-keys, a traveling carriage, a plurality of adjoining registers, each having denominational wheels, a clearance-sign key for each register, a common clearance-sign type-bar operated by said clearance-sign keys, and a bail-piece for locking the clearance-sign key of each register when numbers are computed in the register; means controlled by the carriage at a predetermined position thereof, for locking the clearance-sign key of a cleared register adjoining the register in which computations are being cleared, said locking means including an adjustable dog traveling with the carriage, a lever actuated by said dog, a downwardly-extending link operatively connecting said lever to a lower reversing lever, and linkage for operatively connecting said reversing lever with the bail-piece of the adjacent register in a manner to prevent the depression of its associated clearance-sign key only when the carriage is moved to a predetermined position.

5. In a computing machine having numeral-keys, a traveling carriage, a plurality of registers, each having a series of denominational wheels, and a clearance-sign key for each register, means including a bail-piece for locking the clearance-sign keys when numbers are computed in the registers, and a clearance-sign type-bar operatively connected to all the clearance-sign keys; means controlled by the carriage at a predetermined position thereof for locking the clearance-sign key of the cleared register adjoining the register in which computations are being cleared, said locking means being effective to hold said clearance-sign key in its locked position only during two successive letter-space movements of the carriage.

6. In a computing machine having numeral-keys, a traveling carriage, a plurality of registers, each having a series of denominational wheels, and a clearance-sign key for each register, means including a bail-piece for locking the clearance-sign keys when numbers are computed in their registers, and a clearance-sign type-bar operatively connected to all the clearance-sign keys; means operable by the carriage at a predetermined position thereof for locking the clearance-sign key of the cleared register adjoining that in which computations are being made, said locking means being effective to hold said clearance-sign key in its locked position during several letter-space movements of the carriage, said last-mentioned means including a dog settably mounted upon the carriage, a lever pivotally mounted upon a fixed shaft, said lever being provided with a tab operative to engage said dog during several letter-space movements of the carriage, and linkage for operatively connecting said lever to the locking bail-piece of the cleared register adjoining the register in which computations are being made.

7. In a computing machine having numeral-keys, a traveling carriage, a plurality of registers having a series of denominational wheels, a clearance-sign typing key for each register, and means including a bail-piece for locking each clearance-sign key when numbers are computed in the registers; means operable by the carriage for locking the clearance-sign key of the cleared register adjoining that in which computations are being made, including a carriage-dog, a lever on the frame of the machine, a link conected to said lever, a lower lever operatively connected to said link, a member actuated by said lower lever, means for promoting a parallel movement of said member, a bar intermediate said member and the locking bail-piece of the cleared register, and means for operatively connecting said bar with said member.

8. A computing machine having a traveling carriage and registers, each register having a normally-depressible clearance-sign typing key; means movable by the carriage in letter-spacing after passing the zone of one register, and operative at the clearing of a second register, to prevent typing of a clear sign by means of the sign-key of the first register.

9. In a computing machine having a traveling carriage, a register having a series of digit-wheels, a typing key to type a sign indicating a computative state of the register, and means common to the digit-wheels to prevent the depression of said key to type; means operable at a predetermined point in the travel of the carriage to automatically lock the key by the same locking means operable by the digit-wheels.

10. In a computing machine having a traveling carriage, a register having digit-wheels, a typing key to type a sign indicating a computative state of the register, and a bail operable by each digit-wheel in computing to check the depression of said key to type; means operable at a predetermined point in the travel of the carriage to automatically operate said bail to prevent typing by the key.

11. In a computing machine having a letter-spacing carriage, a register having digit-wheels, a clearance-sign typing key, and a universal locking bar controllable by each digit-wheel to prevent said clearance-sign key from typing; means under the control of the carriage in letter-spacing and operatively connectible with the universal locking bar of the register, to prevent the typing of its sign-key, though the digit-wheels thereof are cleared to zero.

12. In a computing machine having registers, each having a sign-typing key and sets of denominational jacks, and a traveling carriage having means to actuate each series of jacks to compute; a non-denominational jack positioned intermediate the sets of denominational jacks, and operative during the typing of a digit in the lowest denominational position to clear one register, to automatically lock the sign-typing key of the adjoining register until the sign-key of the register being cleared is depressed to type its register-clearing sign.

13. In a computing machine having registers, each having a sign-typing key, sets of denominational jacks, and a traveling carriage having means to actuate each set of jacks to compute, a non-denominational jack positioned intermediate the two sets of denominational jacks, and operative during the typing of a digit in the lowest denominational position to clear one register, to automatically lock the sign-typing key of the adjoining register until the sign-key of the register being cleared is depressed to type its register-clearing sign, the depression of said last-named key, in typing its register-clearing sign, being effective to letter-space the carriage and release the locked sign-key.

14. In a computing machine having a traveling carriage and a pair of registers, each register having a sign-printing key normally depressible to print when the register is clear; locking means movable by the carriage in letter-spacing and operatively connected to the sign-printing key of a cleared register to prevent the depression of said key until the sign-printing key of the other register being cleared has been depressed for printing an indication of its clearance.

15. In a computing machine having a traveling carriage and a pair of registers, each register having a sign-printing key normally depressible to print when the register is clear; means movable by the carriage during a single letter-space movement thereof operable to prevent the depression of the sign-key for a cleared register until the sign-key of the other register being cleared has been depressed to indicate a cleared register and letter-space the carriage.

16. In a computing machine having a letter-spacing carriage, a spacing bar therefor, and a plurality of registers, each register having a key normally depressible to print, when the register is clear, and letter-space the carriage; means operable by the letter-spacing travel of the carriage to prevent the depression of the key of any cleared register until the printing key of the register being cleared has been depressed to clear its register, said means being effective during the depression of the space-bar to letter-space the carriage before the sign-printing key of said cleared register can be depressed.

HENRY RESCH.